United States Patent
Proudfoot et al.

(10) Patent No.: US 7,561,312 B1
(45) Date of Patent: Jul. 14, 2009

(54) SYSTEMS AND METHODS FOR GLARE REMOVAL USING POLARIZED FILTERING IN DOCUMENT SCANNING

(75) Inventors: Robert A. Proudfoot, Santa Clara, CA (US); Marc Levoy, Stanford, CA (US)

(73) Assignee: Google Inc., Mountain View, CA (US)

( * ) Notice: Subject to any disclaimer, the term of this patent is extended or adjusted under 35 U.S.C. 154(b) by 644 days.

(21) Appl. No.: 10/958,940

(22) Filed: Oct. 4, 2004

(51) Int. Cl.
 *H04N 1/00* (2006.01)
(52) U.S. Cl. .................. 358/475; 358/400; 358/401; 358/474; 348/370; 348/371; 348/375
(58) Field of Classification Search .............. 358/500, 358/505, 509, 400, 401, 474, 475; 396/429; 348/370, 371, 375
 See application file for complete search history.

(56) References Cited

U.S. PATENT DOCUMENTS

| | | | | |
|---|---|---|---|---|
| 4,972,494 A | * | 11/1990 | White et al. | 382/143 |
| 5,847,846 A | * | 12/1998 | Wu et al. | 358/475 |
| 6,028,303 A | * | 2/2000 | Suzuki | 250/225 |
| 6,907,193 B2 | * | 6/2005 | Kollias et al. | 396/4 |
| 6,975,360 B2 | * | 12/2005 | Slatter | 348/370 |
| 7,098,920 B2 | * | 8/2006 | Marschner et al. | 345/473 |
| 2004/0263510 A1 | * | 12/2004 | Marschner et al. | 345/419 |

* cited by examiner

*Primary Examiner*—Mark K Zimmerman
*Assistant Examiner*—Kent Yip
(74) *Attorney, Agent, or Firm*—Fish & Richardson P.C.

(57) ABSTRACT

Systems and methods using polarized filtering for glare removal to improve the process of scanning documents, particularly bound documents with glossy content, are disclosed. The system may generally include a lighting source for illuminating a document, a lighting source polarizer attached to the lighting source to polarize light therefrom, a camera for capturing images of the document, and a camera polarizer attached to the camera. The camera polarizer and the lighting source polarizer may be positioned relative to each other so as to facilitate blocking light reflections causing glare off of the document resulting from the lighting source and arriving at the camera. The system may include multiple lighting sources, some or all of which may have a lighting source polarizer attached thereto.

20 Claims, 3 Drawing Sheets

SYSTEMS AND METHODS FOR GLARE REMOVAL USING POLARIZED FILTERING IN DOCUMENT SCANNING

BACKGROUND OF THE INVENTION

1. Field of the Invention

The present invention relates generally to scanning documents. More specifically, systems and methods using polarized filtering for glare removal to improve the process of scanning documents, particularly bound documents with glossy content, are disclosed.

2. Description of Related Art

Scanning books, magazines, and other printed material into digital form has become more common with the advent of improved imaging, storage and distribution techniques. Although unbound printed material can generally be scanned with relative ease using automatic page-feeding mechanisms such as those commonly found on digital copiers and scanners, bound documents present additional challenges. Bound documents include not only books, but also periodicals, manuscripts, pamphlets, brochures, newspapers, manuals, and any other document having a bound edge. Many institutions, such as the libraries, universities, bookstores, and private enterprises have vast collections of bound documents. By converting these documents into electronic form, such institutions can reduce the cost of storage, facilitate remote access, enable simultaneous access by multiple users, facilitate search and retrieval of information, and/or protect information in rare or out-of-print works from loss or destruction.

Once the content of a bound document is scanned, the recorded image can be manipulated or otherwise processed. Digitally recorded bound documents can be reformatted, supplemented with additional information, compressed, and/or processed with OCR (optical character recognition) software, and indexed to facilitate electronic search. Thus, scanning and recording of bound documents facilitates the creation of digital libraries that can be remotely and simultaneously accessed and searched by multiple users.

Various mechanisms have been developed to enable the scanning of bound documents. For example, a traditional flat-bed platen scanner scans bound documents in a face-down position. However, for best results, a flat-bed scanner typically requires the application of force to the spine or binding region of the bound documents to insure that they come within the scanner's depth of focus. Such force can damage the spine region of the document. In addition, using the flat-bed platen can be tedious and time-consuming, as the bound documents typically must be lifted and repositioned after each page is scanned. Further, image quality is often poor due to loss of focus, uneven illumination, and/or distortion caused by page curvature in the vicinity of the binding.

An alternative to the traditional flat-bed platen scanner is a platen-less scanner that captures image data from a bound document in a face-up position. Such scanners typically do not require application of additional stress to the binding region of a bound document, since the document is scanned in its natural, face-up position. Some such scanners make use of automatic page turning apparatuses. In addition, optics and software have been developed for compensating for the image-distortion resulting from the inherently curved surfaces typical of open, edge-bound books that are not subjected to potentially damaging flattening pressure. For example, the curvature of a document's pages may be detected using a curvature detector, with a linear light source for defining a brightness distribution. The detected curves of the page can then be used to approximately rectify image signals received from the document scanner. Such platen-less scanning systems also often employ light sources that shine light onto the pages being imaged.

One problem with such document scanning techniques is that light may be reflected off of the surface of pages that are glossy or shiny to produce undesirable reflections commonly known as glare in the images captured by the camera or other device used to obtain an image of the document. Such glare is not only aesthetically undesirable but may also undermine the accuracy of the image processing in obtaining information from the document and thereby reduce the reliability of information search and retrieval based on the results of the scanning process, rendering the scanned version of the document a less effective, less accurate, and less complete tool for archival purposes.

Accordingly, systems and methods are needed for facilitating the scanning of documents with glossy content.

SUMMARY OF THE INVENTION

Systems and methods using polarized filtering for glare removal to improve the process of scanning documents, particularly bound documents with glossy content, are disclosed. It should be appreciated that the present invention can be implemented in numerous ways, including as a process, an apparatus, a system, a device, or a method. Several inventive embodiments of the present invention are described below.

The system may generally include a lighting source for illuminating a document, a lighting source polarizer attached to the lighting source to polarize light therefrom, a camera for capturing images of the document, and a camera polarizer attached to the camera. The system may include multiple lighting sources, some or all of which may have a lighting source polarizer attached thereto.

The camera polarizer and the lighting source polarizer may be positioned relative to each other so as to facilitate blocking light reflections off of the document resulting from the corresponding lighting source and arriving at the camera. For example, the lighting source polarizer may be positioned relative to the document so as to polarize light from the corresponding lighting source to facilitate reducing light reflections from the corresponding lighting source at the at least one camera.

The system may include two cameras for capturing images of corresponding facing pages of the document and a camera polarizer attached to each corresponding camera. The camera polarizer may be generally oriented in a direction to block or otherwise minimize reflections off of the document resulting from the lighting source having the lighting source polarizer attached thereto. For example, each camera polarizer may be generally oriented perpendicular to the polarized reflections off of the document in order to minimize or otherwise reduce glare.

A method for scanning documents may generally include providing a lighting source for illuminating a document, attaching a lighting source polarizer to the lighting source to polarize light therefrom, attaching a camera polarizer to a camera for capturing an image of the document, and rotating the lighting source polarizer and/or the camera polarizer to optimize reduction of reflection off of the document resulting from the lighting source.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods using polarized filtering for glare removal to improve the process of scanning documents, particularly bound documents with glossy content, are disclosed. It is noted that although the systems and methods are well suited for imaging bound documents with glossy content as described in the examples presented herein, the systems and methods can similarly be adapted or utilized for unbound documents including large, fragile, and/or rare unbound documents. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
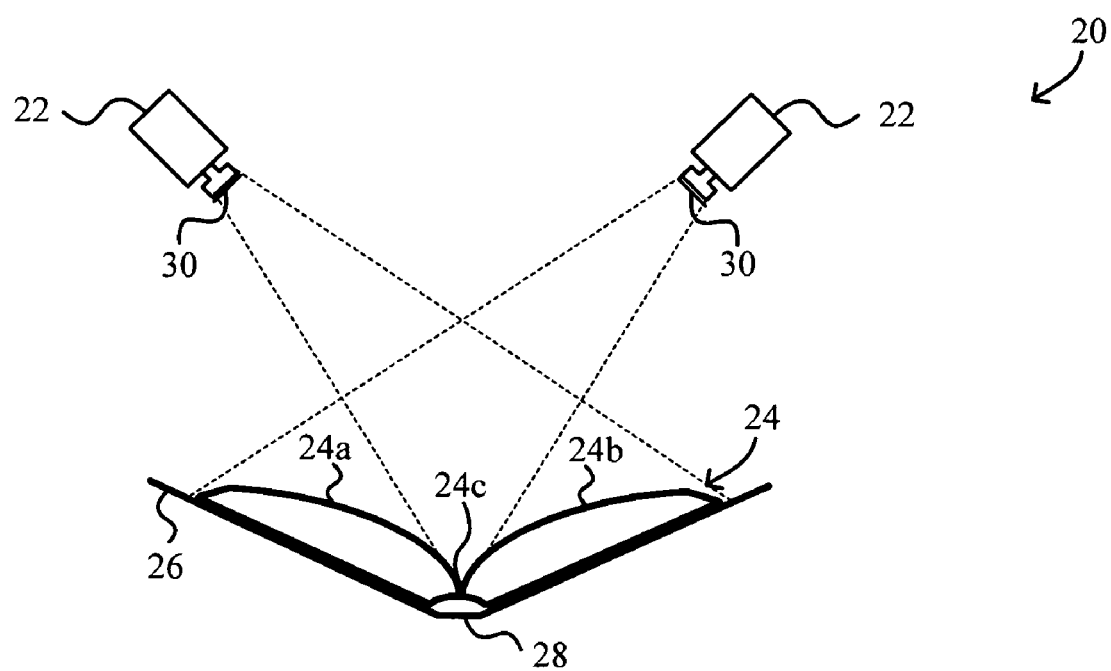
FIG. 1 is a front view of one exemplary embodiment of an image capturing system utilizing polarizing filters.
Figure 2:
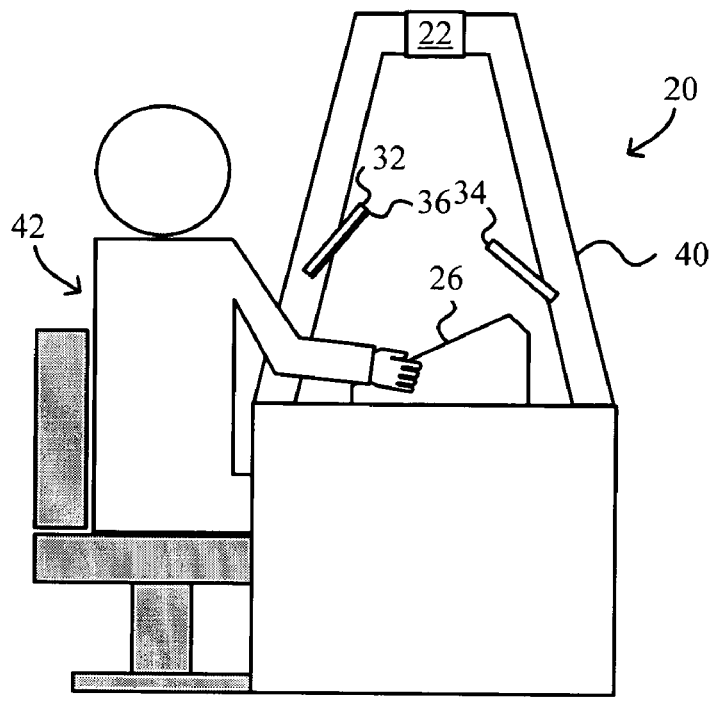
FIG. 2 is a side view illustrating an operator at the image capturing system of FIG. 1.

FIG. 1 is a schematic diagram of one exemplary embodiment of an image capturing system 20 and FIG. 2 is a schematic diagram illustrating an operator 42 at the image capturing system 20. The image capturing system 20 generally includes one or more cameras 22, such as two high resolution cameras each for imaging or photographing a corresponding facing page 24A, 24B of an open bound document, such as a book 24, resting in a support, such as an angled cradle 26, a table top, or a mechanical device specially adapted for holding books and other documents. The cradle 26 may provide a generally flat gutter 28 such that the spacing between the left and right sides of the cradle 26 may be adjustable. The cradle spacing can be adjusted so as to maintain the distances of the pages to the camera relatively the same for books of different thicknesses in order to maintain camera focus. It is to be understood that although a book is used herein in describing the imaging system and process, the system and process may be utilized to and/or adapted to image any other suitable type of bound documents such as periodicals, manuscripts, pamphlets, brochures, newspapers, manuals and/or any other types of documents having a bound edge, typically with a hard or soft cover. In addition, although the cameras 22 are shown as an exemplary image capturing mechanism for the image capturing system 20, any other image capturing mechanism such as a camera in combination with moving mirrors may be employed. The system 20 may include a housing 40 or other structure to house or otherwise support the cameras 22, lighting mechanism, and/or other components of the image capturing system 20. The cameras 22 facilitate in converting the facing pages 24a, 24b into electronic form for processing using, e.g., optical character recognition (OCR) techniques to produce an editable and/or searchable version of the document's text.

Figure 3:
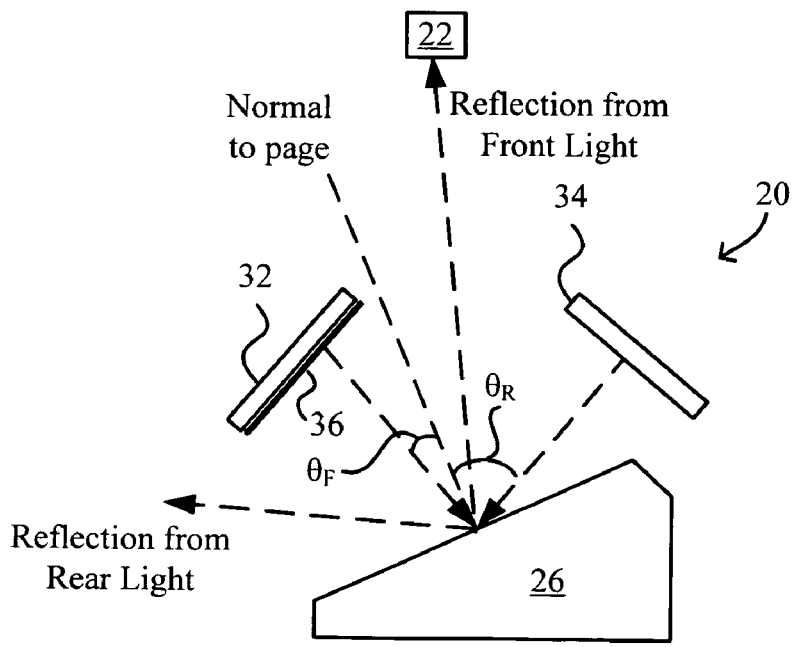
FIG. 3 is a side view illustrating the angles of incidence for the lights of the image capturing system of FIG. 1 in more detail.

To illuminate the document 24 being scanned, front and rear lights 32, 34 may be provided. Although described herein as a single front light (or a single light unit) 32 and a single rear light (or a single light unit) 34, various combinations of suitable numbers of front and rear lights (or light units) 32, 34 may be utilized. Furthermore, various other illumination configuration may be employed such as side and/or overhead lights instead of or in addition to the front and/or rear light 32, 34. As shown in more detail in FIG. 3, the rear light 34 may be positioned lower and relatively close to the book 24 at a high angle of incidence $\theta_R$ relative to the book 24, i.e., at a low lighting angle close to the horizontal of the facing pages 24a, 24b of the book 24, but without casting shadows from the back side of the book 24. Because the front light 32 is positioned higher, i.e., further away from the book 24, so as to provide clearance for the operator's arms for turning the pages of the book 24, the front light 32 has a smaller angle of incident $\theta_F$ relative to the book 24.

Note that the two sides of the cradle 26 corresponding to each facing page 24a, 24b, respectively, may form a cradle angle of approximately 130° for better ergonomics and book curvature. Because of the cradle angle, it may be difficult to achieve sufficient and even lighting without producing glare when imaging glossy or shiny pages. In particular, light from the various light sources, e.g., front and/or rear lights 32, 34 and/or ambient light, may be reflected off of the surface of pages, particularly pages that are glossy or shiny, to produce undesirable reflections or glare in the images captured by the cameras 22. More specifically, a semicircular band of glare at the bottom edge of each page 24a, 24b can result especially when the pages are glossy. However, not all light sources contribute equally to producing glare in images captured by the cameras 22. Typically, each light 32, 34 has multiple light sources, e.g., multiple bulbs, rather than point sources. Merely as an example, the front light 32 may have 4 lights or bulbs spread out over approximately 1' and the rear light 34 may have 6 lights or bulbs spread out over approximately 1.5'. Because the lights 32, 34 are relatively close to the pages 24a 24b, there is a large range of angle of incidences on the pages 24a 24b. In the example shown in FIG. 3, the most amount of glare results from the top portion of the front light source 32 as it is higher relative to the pages and thus reflects glare into the cameras 22. In particular, the incidence of light from the top portion of the front light source 32 on the bottom portions of the pages 24a 24b causes the most amount of glare at the cameras 22. Ambient light generally contributes little, if any, noticeable glare. To reduce glare, polarized light and camera setup may be implemented as described below.

Polarizers and Polarization

To help reduce the glare, a polarizing film or filter 36 may be positioned over or incorporated into the front light 32 to polarize the light incident on the facing pages 24a, 24b such that reflections resulting from the front light 32 is also polarized. An additional polarizing film or filter (not shown) may be positioned over or incorporated into the rear light 34 although, as noted above, the rear light 34 in the exemplary configuration shown in FIG. 2 contributes to only a small portion, if any, of the noticeable glare. Furthermore, a polarizer 30 may also be provided for each camera 22. Polarizing filters are useful in imaging where they can be attached to the front of a camera lens to reduce glare and increase overall image contrast in photographs or digital images. Polarizing filters utilized on cameras are generally designed with a mounting ring that allows them to be rotated in use to achieve the desired effect under various lighting conditions. As will be described in more detail below, the polarizer 36 facilitates in polarizing the light incident on the facing pages 24a, 24b from the front light 32 and the reflections resulting therefrom. The polarizers 30 of the cameras 22 thus can be more effective in reducing or removing glare by filtering out or canceling the polarized reflections from the front light 32. The concepts of polarization and functions of polarizers in general are presented below to better illustrate the glare reduction or removal by the polarizers 30, 36 for the cameras 22 and the front light 32.

Most of the primary light sources encountered by the cameras 22, e.g., lights 32, 34, sun, moon, other indoor lighting, flash lamps, etc., are unpolarized, i.e., the light waves vibrate and radiate equally and randomly in all directions perpendicular to the direction of propagation. Light is polarized when its vibrations are aligned into one or more planes of direction. Polarization can occur either naturally or artificially. Unpolarized light typically acquires polarization naturally through absorption, scattering or reflection. For example, light reflected by non-metallic surfaces is often at least partially polarized, i.e., the orientations of the light waves are polarized or restricted to a plane parallel to the reflecting surface or perpendicular to the plane of incidence. Thus reflections off of the page surfaces, particularly highly reflective glossy page surfaces, of the document 24, are at least partially polarized with the light waves vibrating in a direction parallel to the page surface. However, naturally occurring polarization due to reflection off of glossy pages is relatively weak and is generally insufficient to filter out much of the resulting glare.

The degree of polarization of the reflected light is dependent on the incident angle of the light. When considering the incidence of non-polarized light on a flat non-metallic surface, there is a unique angle, Brewster's angle, at which the reflected light waves are all polarized into a single plane and the component of light parallel to the plane of incidence is refracted into the reflecting material. Brewster's angle is measured from normal to the reflecting surface and is equal to the arc tangent of the refractive index for the material of the reflecting surface. Thus the Brewster's angle is dependent on the material of the reflecting surface. The Brewster's angle for glossy paper may vary depending on the type and construction of the glossy page. When incident light arrives on the surface at the Brewster's angle, there is 100% polarization into a single plane perpendicular to the plane of incidence and parallel to the reflecting surface. However, as noted above, the lights 32, 34 are not point lights sources and result in a multitude of angles of incidence such that a relatively small portion of the glare area may be at the Brewster's angle to create polarization. Thus by polarizing the light from the light source, e.g., the front light 32, the glare is more effectively filtered out at the camera with a polarizing filter on the cameras 22.

Reflecting surfaces are smooth, rough or somewhere in between. Reflections off of smooth, mirror-like surfaces are often referred to as specular reflections while reflections off uniformly rough surfaces are often referred to as diffuse reflections. In between specular and diffuse reflections are spread reflections which exhibit some directionality and may acquire some polarization. Specular reflections, like those off of the facing pages 24a, 24b, are the type of reflections that are best controlled by polarizers and the type of reflections that most often need to be suppressed. Most smooth non-metallic surfaces tend to impart polarization on the reflected light by absorbing or transmitting certain light wave orientations and reflecting, or more accurately, reradiating, others. Unpolarized light reflected off of smooth non-metallic surfaces tends to become at least partially polarized in the process. In addition, polarized light, such as the light from the front light 32 with the polarizer 36 attached thereto, reflected off of smooth non-metallic surfaces generally retains the polarization.

Polarizing devices or filters, also generally referred to as polarizers, are often used to eliminate or reduce reflections or glare from reflective non-metallic surfaces. When controlling glare off a non-metallic specular reflecting surface, the farther off the Brewster's angle from the normal to the reflecting surface the light source is, the less effective a polarizer will be. However, with the addition of the polarizer 36 to the front light 32, the angle of incidence of the front light 32 need not be at the Brewster's angle in order for the reflections resulting from the front light 32 to also be polarized and thus more effectively removed by the polarizers 30 at the cameras 22.

In particular, polarizing filters pass incident light linearly polarized in a passing axis, while strongly absorbing light polarized along a blocking axis perpendicular to the passing axis. When unpolarized light impinges on a polarizer, those polarizations closest to the passing axis are attenuated the least while those polarizations closest to the blocking axis are attenuated the most. In other words, a polarized filter generally only allows light waves vibrating in one orientation to pass through and the light that passes through the polarizing filter is considered polarized. Polarized lenses contain filters that let through only one direction of light while absorbing all other light.

Polarizing filters are commonly made of optical materials with crystalline structures assembled into a film and applied to a substrate such as transparent plastic or glass surface. The chemical film may be composed of molecules that naturally align parallel to one another such that the molecules create a microscopic filter that blocks light that does not match the alignment of the molecules. Polarizing materials can vary in their effectiveness and spectral properties. The aligned molecules act like parallel slits that allow light waves vibrating in the passing axis to pass through. Thus a second polarizing filter placed so that its molecules are aligned at a right angle to those of the first polarizing filter should block all the light. The polarizing filters thus readily pass incident light linearly polarized in the passing axis while strongly absorbing light polarized along the perpendicular direction, the blocking axis.

As is evident, polarizers are angle-dependent. In other words, an image is not equally affected in all orientations of the polarizing filter. In one example, the polarizers 30 for the cameras 22 may be oriented generally in a direction normal to the reflecting surface so that the page image is perpendicular to the lens axis for minimum distortion of the page image. The polarizer 36 for the front light 32 and the polarizers 30 for the cameras 22 may be oriented generally relative to each other in directions to maximize canceling of the resulting polarized light reflecting off of the pages. In general, the polarizers 30 for the cameras 22 may be rotated during setup and calibration to empirically achieve optimum glare reduction, for example. Alternatively or additionally, the polarizer 36 for the front light 32 may similarly be rotated during setup and calibration to achieve optimum glare reduction.

Where polarization filters are to be installed on multiple glare-causing light sources, the polarizing material for each light source should be oriented relative to the polarization filter for the camera to optimally minimize the overall glare at the camera. As an example, after the camera filters are installed on the cameras, e.g., at a random orientation, each glare-causing light source can be turned on by itself and the polarization filter for that light source is rotated until minimum glare is achieved at the cameras, i.e., in the camera image. As an alternative set-up process, a filter may be installed on a first glare-causing light source at, for example, a random orientation. With only the first light source illuminating the pages, the polarizing filters for the cameras are then oriented until a maximal glare filtering is achieved in the camera images. Each of the other glare-causing light sources can then be turned on by itself in turn and the polarization filter for that light source is rotated until minimum glare is achieved at the cameras. Various other set-us processes may be similarly employed. Note that in cases of multiple glare-causing light sources, it may not be possible to optimally reduce the glare from all light sources depending on the complexity of the geometry of the reflecting surfaces. However, a set of filter orientations can be determined to minimize or otherwise reduce the glare at the cameras.

As is known, a polarizing filter or film blocks a certain amount of light from passing through the filter. Thus the provision of double polarizing filters 30, 36 reduces the light available at the camera lens by several F-stops such that exposure is compensated by way of a slower shutter speed and/or a larger aperture. It is noted that in certain applications, a larger aperture may provide a shallower depth of field and thus may bring the portions of an image of a curved page out of focus which may in turn, for example, reduce the accuracy of any optical character recognition performed on the resulting image. Merely as an example, each of the polarizing filters 32, 36 may block approximately 50% of the light from passing through the corresponding filter. Assuming that the front and rear 32, 34 lights would otherwise each contribute 50% of the lighting, approximately 50% of the illumination from the front light 32 or 25% of the total illumination from the front and rear lights 32, 34 would be blocked by the polarizing filter 36 for the front light 32, i.e., approximately 75% of the total illumination from the lights 32, 34 would arrive at the filter 30 for each camera 22. The camera polarizing filters 30 would then further block 50% of the light from the cameras 22. As approximately 75% of the total light from the front and rear lights 32, 34 arrives at each polarizing filter 30 for the cameras 22, approximately 37.5% of the light that would otherwise arrive at the cameras 22 in the absence of any of the polarizing filters 30, 36 would arrive at each camera 22. The cameras 22 should thus captures images at approximately 3 times slower shutter speed. The exact shutter speed may vary depending on, for example, the relative distances of the lights from the pages being images which in turn affects the amount of light contributed by each of the light sources. In one example, the shutter speed was empirically determined to be approximately 3.5 times slower.

The two basic types of polarizing filters or polarizers are linear and circular polarizing filters, generally differing with regard to camera compatibility and price, circular polarizing filters being generally more expensive than linear polarizing filters of comparable quality. For example, the optical systems of certain cameras such as many auto-focus SLR (single lens reflex) cameras require the use of circular polarizers due to their use of reflection mirrors or beam-splitting metering systems that themselves polarize light. Digital cameras on the other hand generally do not have reflection mirrors and thus can use either linear or circular polarizers. Thus as the cameras 22 are typically digital cameras, either linear or circular polarizers may be used.

It should thus be appreciated that FIGS. 1 and 2 are provided for purposes of illustration, and that numerous modifications could be made to the system 20 shown without departing from the spirit or scope of the present invention. For example, while one set of cameras 22 is shown for imaging the facing pages 24a, 24b, additional cameras such as stereoscopic cameras positioned directly above the facing pages 24a, 24b may be provided to gather three-dimensional data for three-dimensional modeling. As another example, although the pages of the book 24 are turned by an operator 42, an automatic page turner may instead by employed as part of the system 20. In such a configuration, the front and rear lights 32, 34 may be positioned at similar distances and angles relative to the book 24.

As yet another example, a dark or black sheet covering each facing page 24a, 24b in turn may be utilized to further reduce glare. In particular, when the facing page 24a is being imaged, the opposing facing page 24b may be covered by a dark sheet to remove any glare resulting from reflected light from the opposing facing page 24b. However, as is evident, such a configuration may slow the image capturing process as each facing page 24a, 24b would be imaged separately rather than simultaneously. As another example, the system 20 may be isolated from ambient room lighting and/or stray lighting from other image capturing systems 20 when multiple systems 20 are in use simultaneously so as to prevent stray reflections from ambient lighting and/or from adjacent stations. For example, each system 20 may include dividers or partitions such as dark curtains or walls particularly when multiple systems 20 are in close proximity to each other and/or when ambient room lighting is strong. However, the illumination of the lights 32, 34 of each system 20 are typically significantly greater than that from ambient room lighting or stray lighting from other nearby systems 20 such that isolation of each system 20 may not be necessary or cost effective.

Figure 4:
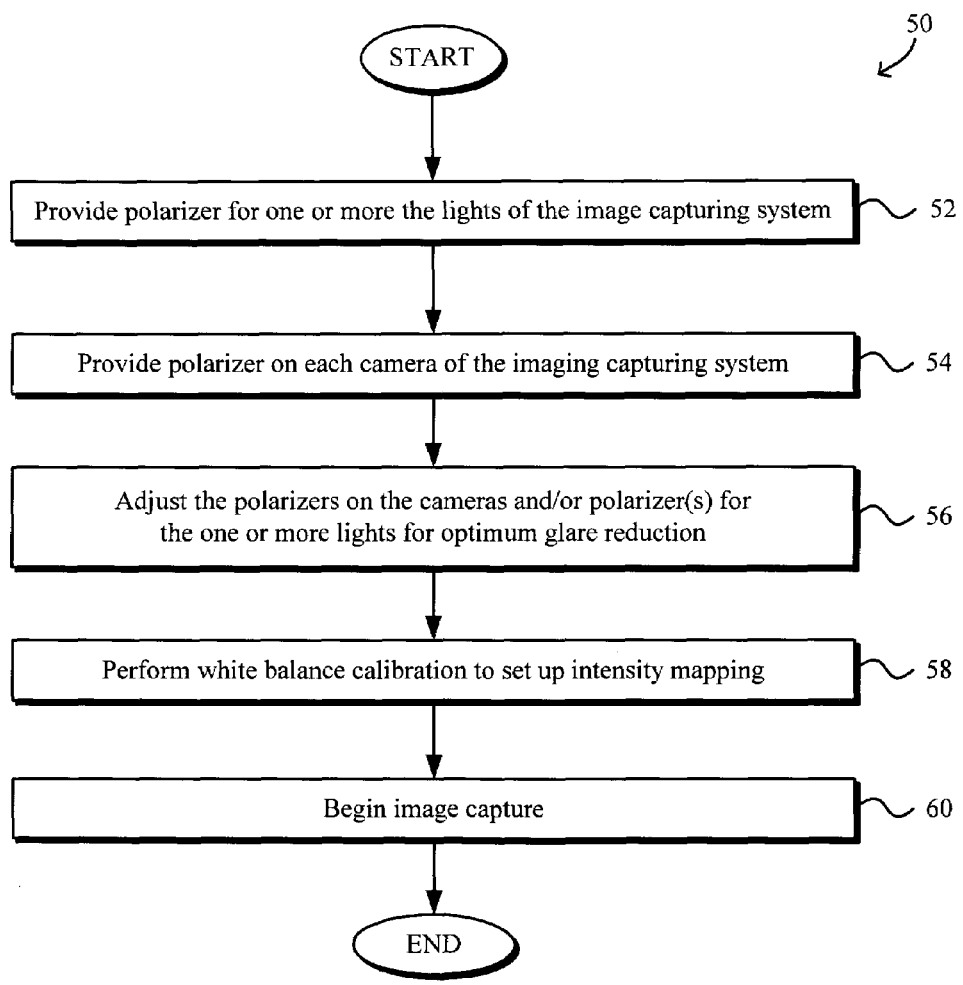
FIG. 4 is a flowchart illustrating a process for setting up the image capturing system with polarizers for glare reduction to improve the process of scanning documents.

FIG. 4 is a flowchart illustrating a process 50 for setting up the image capturing system with polarizers for glare reduction to improve the process of scanning bound documents. At block 52, a polarizer is provided for at least one of the lights of the image capturing system. At block 54, a polarizer is provided for each camera of the image capturing system, e.g., by attaching the polarizer over a lens of each camera. The polarizers for the cameras are then adjusted, e.g., by rotating the polarizer relative to the camera lens, at block 56, for optimum glare reduction. Block 56 may be performed by iteratively capturing test images and adjusting the polarizers to achieve the optimum angle of the polarizer relative to the camera lens. At block 58, intensity mapping can be set up by performing a white balance calibration. At block 60, the image capturing process begins. It is noted that the image capturing process may include post processing with intensity mapping to compensate for variations in the lighting within each image of each facing page.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A document scanning system, comprising:
a lighting unit for illuminating a document, the lighting unit comprising:
a first light illuminating the document from a first direction; and
a second light concurrently illuminating the document from a second direction distinct from the first direction, wherein the first light and the second light are oriented such that light from one of the first light and the second light reflects toward a camera and light from the other of the first light and the second light reflects away from the camera;
a lighting unit polarizer attached to one of the first and second lights of the lighting unit to polarize light from the one of the first and second lights of the lighting unit;
the camera for capturing images of the document;
a cradle for supporting the document in a fixed position relative to the camera to orient one of a plurality of pages of the document relative to the camera; and
a camera polarizer attached to the camera.

2. The document scanning system of claim 1, wherein the camera polarizer is positioned relative to the lighting unit polarizer to facilitate filtering light reflections causing glare off of the document resulting from the lighting unit.

3. The document scanning system of claim 1, wherein the lighting unit polarizer is positioned relative to the document so as to polarize light from the lighting unit to facilitate reducing light reflections causing glare from the lighting unit at the camera.

4. The document scanning system of claim 1, the system comprising multiple lighting units and a single lighting unit polarizer for only one of the multiple lighting units.

5. The document scanning system of claim 1, the system comprising two cameras each for capturing images of corresponding facing pages of the document and two camera polarizers each attached to a corresponding one of the two cameras.

6. The document scanning system of claim 1, wherein the camera polarizer is generally oriented in a direction to block reflections causing glare off of the document resulting from the lighting unit having the lighting unit polarizer attached thereto.

7. The document scanning system of claim 1, wherein the camera polarizer is generally oriented with its polarizing material perpendicular to the polarized light reflections causing glare off of the document.

8. A method for scanning documents, comprising:
providing a lighting unit for illuminating a document, the lighting unit comprising:
a first light illuminating the document from a first direction; and
a second light concurrently illuminating the document from a second direction distinct from the first direction, wherein the first light and the second light are oriented such that light from one of the first light and the second light reflects toward a camera and light from the other of the first light and the second light reflects away from the camera;
attaching a lighting unit polarizer to one of the first and second lights of the lighting unit to polarize light from the one of the first and second lights of the lighting unit;
attaching a camera polarizer to the camera for capturing an image of the document;
rotating at least one of the lighting unit polarizer and the camera polarizer to optimize reduction of reflection causing glare off of the document resulting from the lighting unit; and
supporting the document in a fixed position relative to the camera to orient one of a plurality of pages of the document relative to the camera.

9. The method for scanning documents of claim 8, wherein the attaching the camera polarizer includes attaching a camera polarizer to each of two cameras, each for capturing images of corresponding facing pages of the document.

10. The method for scanning documents of claim 8, wherein the rotating at least one of the lighting unit polarizer and the camera polarizer to optimize reduction of reflection causing glare includes capturing test images to determine optimize reduction of reflection.

11. The method for scanning documents of claim 8, wherein the attaching the lighting unit polarizer includes orienting the lighting unit polarizer so as to polarize light from the lighting unit to facilitate reducing light reflections causing glare from the lighting unit at the camera.

12. The method for scanning documents of claim 8, wherein the providing includes providing multiple lighting units and the attaching includes attaching a single lighting unit polarizer to only one of the multiple lighting units.

13. The method for scanning documents of claim 8, wherein the rotating includes generally rotating the camera polarizer to an orientation to block reflections causing glare off of the document resulting from the lighting unit having the lighting unit polarizer attached thereto.

14. The method for scanning documents of claim 8, wherein the rotating includes generally rotating the camera polarizer to an orientation perpendicular to the reflected polarized rays causing glare from the book surface.

15. A method for reducing glare in imaging documents, comprising:
attaching a lighting source polarizer to a lighting source to polarize light from the lighting source, the lighting source to illuminate a document to be imaged, wherein the lighting unit comprises:
a first light illuminating the document from a first direction; and
a second light concurrently illuminating the document from a second direction distinct from the first direction, wherein the first light and the second light are oriented such that light from one of the first light and the second light reflects toward a camera and light from the other of the first light and the second light reflects away from the camera, and wherein the lighting source polarizer is attached to one of the first and second lights of the lighting unit;
attaching a camera polarizer to the camera for imaging pages of the document, the camera polarizer and the lighting source polarizer being oriented relative to each other so as to facilitate filtering of reflections causing glare off of the document resulting from the corresponding lighting source at the camera; and
supporting the document in a fixed position relative to the camera to orient one of a plurality of pages of the document relative to the camera.

16. The method for scanning documents of claim 15, wherein the camera polarizer and the lighting source polarizer are oriented so that light waves reflecting of the book page surface that emanated from the lighting source are oriented generally perpendicular to each other.

17. The document scanning system of claim 1, wherein the first light has a higher angle of incidence to the surface of the document than the second light.

18. The method for scanning documents of claim 8, wherein:
the first light comprises a plurality of light sources;
the lighting unit polarizer comprises a plurality of polarizers each associated with one of the plurality of light sources; and
rotating at least one of the lighting unit polarizer and the camera polarizer to optimize reduction of reflection comprises:
for each light source among the plurality of light sources, turning off the other light sources among the plurality of light sources;
measuring an amount of glare off the document from the one light source among the plurality of light sources; and
rotating the polarizer associated with the one light source until the amount of glare off the document is near a minimum measured amount.

19. The method for scanning documents of claim 8, wherein pages of the document are curved.

20. The method for scanning documents of claim 15, wherein the first light and the second light are disposed on either side of the camera.

* * * * *

UNITED STATES PATENT AND TRADEMARK OFFICE
CERTIFICATE OF CORRECTION

PATENT NO. : 7,561,312 B1  Page 1 of 1
APPLICATION NO. : 10/958940
DATED : July 14, 2009
INVENTOR(S) : Proudfoot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Seventh Day of September, 2010

David J. Kappos
*Director of the United States Patent and Trademark Office*